Nov. 9, 1926.

F. M. REID

SEMITRAILER

Filed April 3, 1924   3 Sheets-Sheet 1

INVENTOR.
Frederick Malcolm Reid

ATTORNEY.

Nov. 9, 1926.

F. M. REID

SEMITRAILER

Filed April 3, 1924   3 Sheets-Sheet 3

1,606,044

INVENTOR.
Frederick Malcolm Reid
BY
Stuart C. Barnes
ATTORNEY.

Patented Nov. 9, 1926.

1,606,044

UNITED STATES PATENT OFFICE.

FREDERICK MALCOLM REID, OF DETROIT, MICHIGAN, ASSIGNOR TO FRUEHAUF TRAILER CO., OF DETROIT, MICHIGAN, A CORPORATION OF MICHIGAN.

SEMITRAILER.

Application filed April 3, 1924. Serial No. 703,869.

This invention relates to a semi-trailer and has for its object improved brake equipment. This brake equipment is so arranged that the brakes are automatically set when the supporting wheels or unit is dropped down to the operative position and when the supporting wheels are lifted, the brakes are released.

Furthermore, the brake arrangement is provided with a yieldable connection at the fifth wheel so that when the trailer tends to over-ride the tractor, the brake connections will not be strained or broken.

In the drawings:

Fig. 6 is a section taken on the line 6—6 of Fig. 4.

Figure 1:
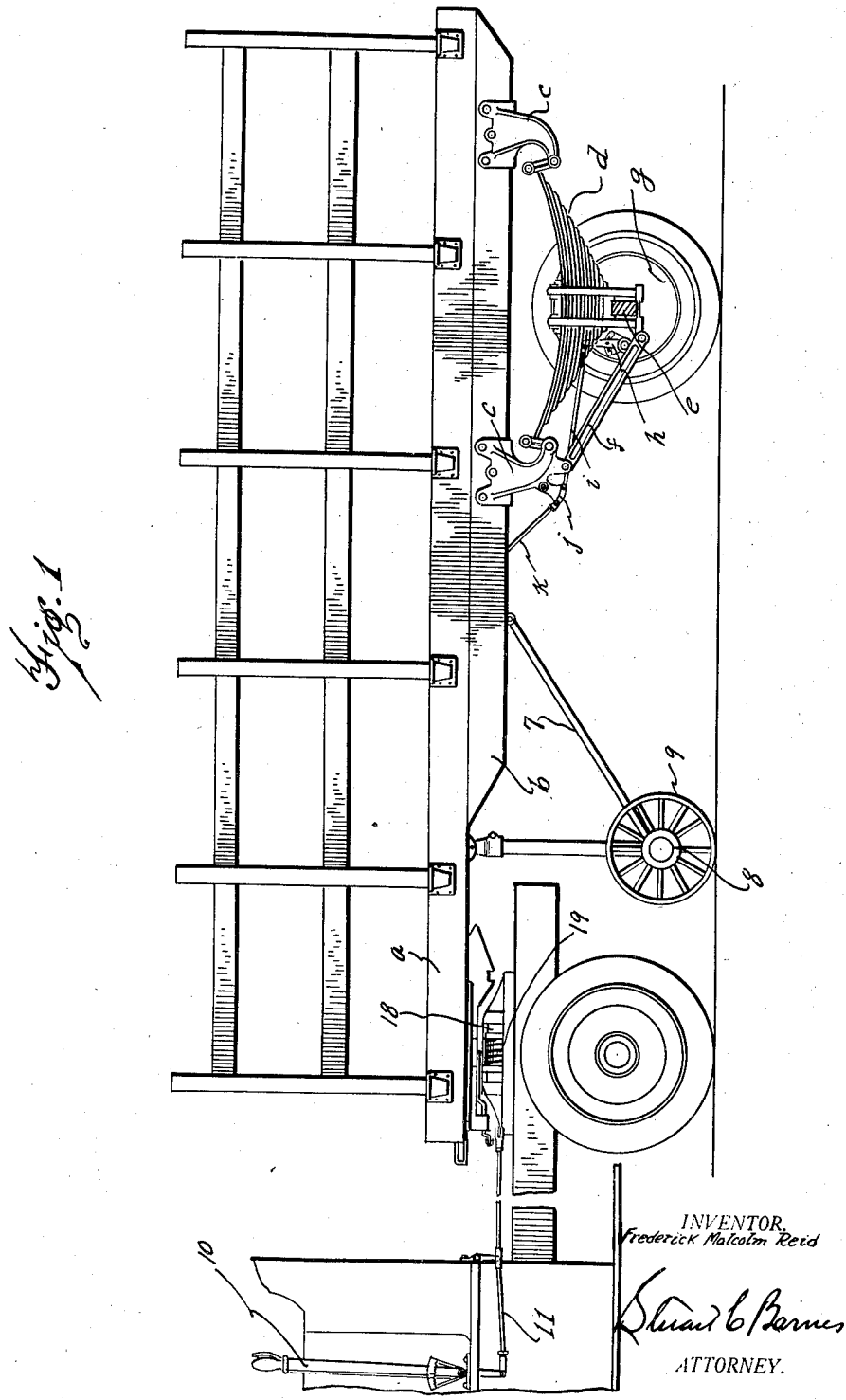
Fig. 1 is a side elevation showing the trailer coupled up with the tractor.
Figure 2:
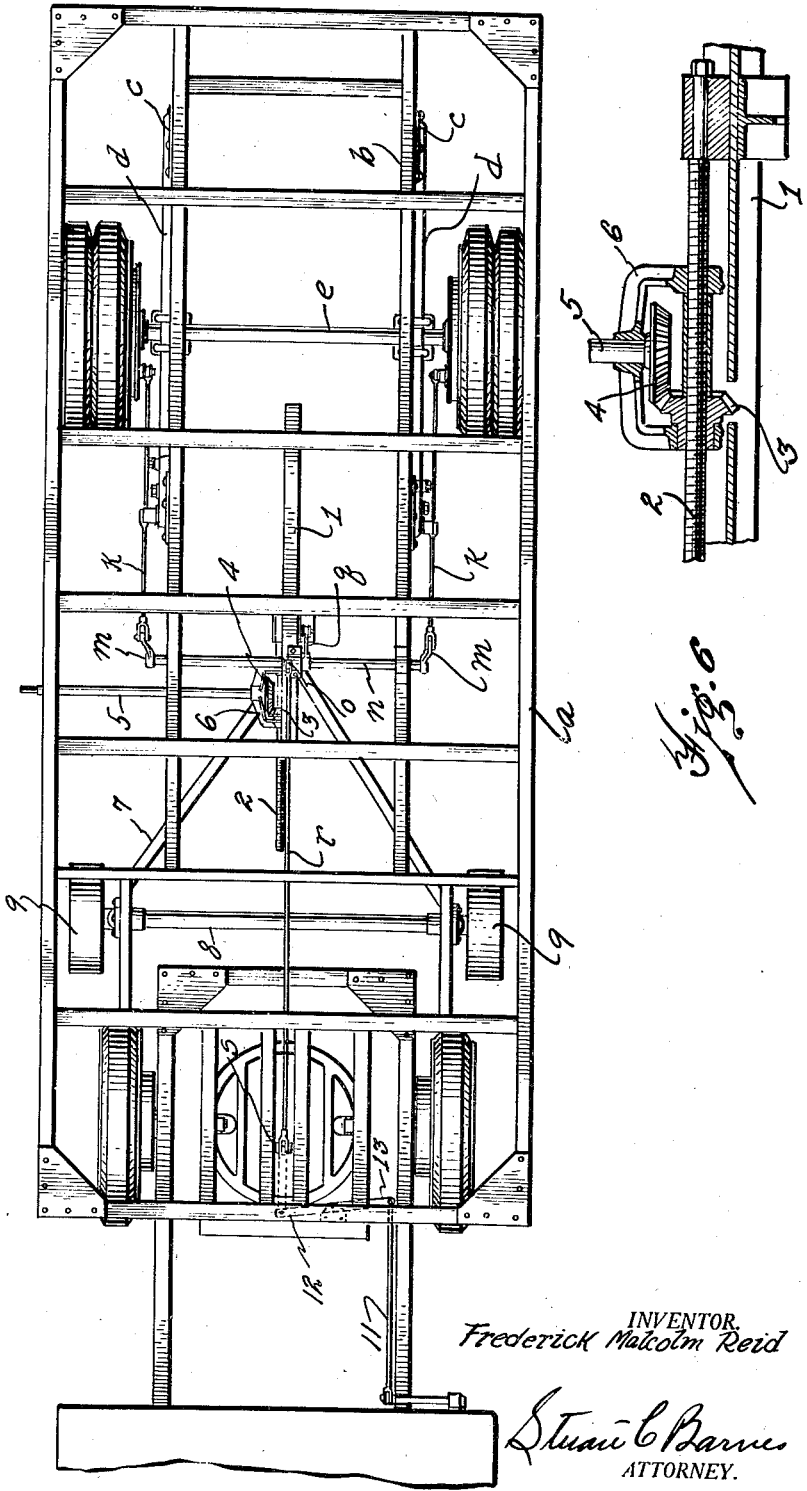
Fig. 2 is a plan view of the trailer coupled up with the rear end of the tractor.
Figure 3:
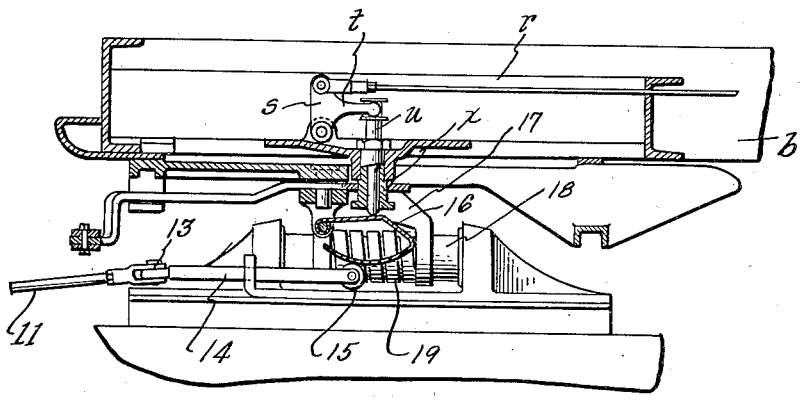
Fig. 3 is a vertical longitudinal section through the fifth wheel parts, showing the parts with the brakes applied.
Figure 4:
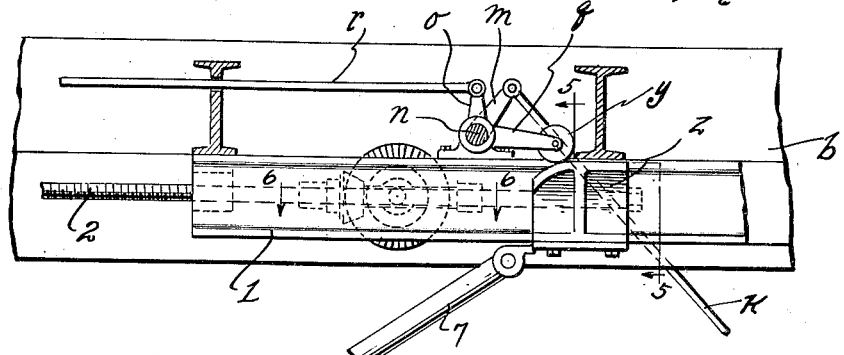
Fig. 4 is a vertical section taken on the line 4—4 of Fig. 2.

My semi-trailer and tractor are provided with brake equipment which is operable from the tractor to apply the brakes on the trailer. The operating connections run through the fifth wheel. This, broadly considered, is old. The invention resides in the improved connections which prevent straining or breaking of the brake connections when the trailer attempts to over-ride the tractor.

a designates the trailer body platform, b the trailer chassis frame; to these are attached the spring hangers c, which support the heavy leaf springs d, which connect with the dead axle e. The radius rods f connect the axle and the spring hangers to relieve the springs of the draft. A brake drum g is provided on each rear wheel and a brake operating lever h operates the internal brake devices, not shown. This is connected with a brake rod i and pivoted on each brake hanger is a segment j. Two intermediate brake rods k connect the segments with the levers m on the end of the crank shaft n. This crank shaft is provided with two crank arms, the upper one o and the lower one q. The upper crank arm o is connected by the draft rod r with the lever s, (see Fig. 3). The lever s is pivoted on the upper fifth wheel plate and is provided with a bifurcated arm t adapted to engage between the collars on the brake operating pin u, which runs through the hollow center of the king pin x. Obviously, when this king pin is raised, it tips the brake operating lever s forward, pulls forward on the brake rods and applies the brakes. This much of the construction, broadly considered, is old.

Figure 5:
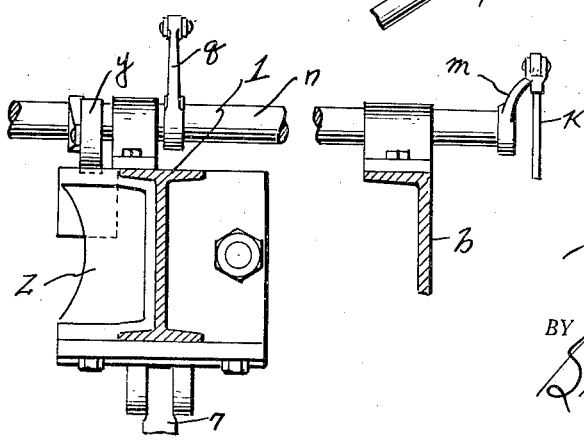
Fig. 5 is a section taken on the line 5—5 of Fig. 4.

The lower crank arm q is provided with a roller y adapted to rest in the path of the slide z (see Fig. 5). This slide is clamped around the center I-beam 1, and can be slid along the I-beam by the operating mechanism consisting of the screw 2, which is rotated by the combined bevel gear and nut 3. This nut is rotated by means of a similar bevel gear 4, carried on the end of the crank shaft 5. The crank shaft can be turned by a hand crank applied to the squared end. The details of the raising and lowering mechanism for the supporting legs are shown in Fig. 6. Now, obviously, when a hand crank is applied to the squared end of the crank shaft 5, this causes the screw 2 to rotate in the nut and inasmuch as the nut is held in the yoke 6 from traveling, the screw itself will have to travel. This causes the slide z to run along the track formed by the I-beam 1. The slide is connected by means of the braces or links 7 with the supporting unit axle 8; on the end of this axle are supporting wheels 9. When the crank is turned, the slide can be turned to move forward and as the supporting unit approaches its lowermost position the slide z encounters the roll y of the brake operating connections. This kicks up the crank arm q and applies the brakes. This is desirable to prevent the trailer from rolling when uncoupled on an incline. It is also desirable to hold the trailer when the tractor backs into the trailer to make the automatic coupling.

The brake operating pin u ordinarily rests in its lower position when the brakes are released. When the operator of the tractor desires to apply the brakes, he pulls the brake lever 10. This pulls the tractor brake rod 11 forward and kicks back the load end 12 of the brake lever 13. The load end of this brake lever is coupled up with a thrust rod 14 which has a roll 15 on its rear end. This thrusts in under the spring loop 16, which thrusts the loop up, kicks up the brake pin and applies the brakes. The shape of this loop is such that its lower face is an arc which is concentric with the rocking center of the fifth wheel, for which reason the brake mechanism will not be affected by the tilting of the fifth wheel.

This brake operating loop 16 also serves to operate the brake connections as an over-ride brake. This loop is pivoted to the lower fifth wheel saddle 17 which rides forward and rearwardly on the guides 18, against the resistance of the spring 19. This gives a yieldable coupling between the trailer and the tractor and permits the trailer to over-ride the tractor slightly. Now, obviously when the trailer begins to override the tractor it carries this loop with it and this will encounter the thrust roller 15, and apply the brakes in the same manner that the hand operated lever applies the brakes, except the application is automatic and due to the over-riding.

If the brakes were already on, due to the pulling back of the hand lever and at this point the trailer attempts to over-ride the tractor, obviously an unusual strain is put on the brake operating gear, as the brake shoes have already reached the limit of their movement and the brake connections are again subjected to more pull due to the overriding action. This would unduly strain or break some of the parts were it not that the loop 16 is a spring member and when subjected to this unusual strain, the yield may take place here and thus relieve the other parts of the strain.

What I claim is:

1. In a semi-trailer, the combination of a tractor and trailer provided with a swivelling connection, brake operating connections located in part on the tractor passing through swivelling connection and located in part on the trailer and arranged to apply braking effort to the trailer wheels, said brake operating connections including a part on the trailer for thrusting on the member passing through the swivelling connection and a part on the tractor for actuating the thrusting part, this thrusting part on the trailer being movable with respect to the actuating part on the tractor to actuate the brakes upon relative movement between the tractor and trailer.

2. In a semi-trailer, the combination of a tractor and trailer provided with a swivelling connection, brake operating connections located in part on the tractor and having a brake operating pin passing through the swivelling connection and the remainder of the connections being located on the trailer and arranged to apply braking effort to the trailer wheels, the said brake connections including a yieldable loop for thrusting on said brake operating pin.

3. In a semi-trailer, the combination of a tractor and trailer provided with swivelling connections and provided with a pivoted loop, a brake operating pin passing through the swivelling connections and provided with brake connections for applying brake effort to the wheels of the trailer, brake operating connections on the tractor including a thrust member, said loop being raised against the pin to apply the brakes when the brake operating thrust member is thrust under the loop.

4. In a semi-trailer, the combination of a tractor and trailer provided with swivelling connections, a brake operating pin passing through the swivelling connections, brake operating connections on the trailer coupled up with the said pin for applying braking effort to the trailer wheels, brake operating connections on the tractor, and a pivoted spring loop, said brake connections on the tractor including a thrust member arranged to thrust in under the pivoted loop to move the pin and apply the brakes.

5. In a semi-trailer, the combination of a tractor and trailer provided with swivelling connections, the tractor provided with a yielding support for the swivelling connections which permits the trailer to override the tractor slightly and brake operating connections passing through the swivelling connections of the trailer and located in part on the tractor and part on the trailer, said brake operating connections having a yieldable unit arranged to allow the connections to yield under undue strain, and also arranged to be applied by the trailer overriding the tractor.

6. In a semi-trailer, the combination of a tractor and trailer provided with swivelling connections, the tractor provided with a yielding support for the swivelling connections which permits the trailer to override the tractor slightly and brake operating connections passing through the fifth wheel of the trailer and located in part on the tractor and part on the trailer, said brake operating connections having a hand control to apply the brakes, and also arranged to be applied by the trailer overriding the tractor, the said brake connections including also a yieldable thrust member whereby when the trailer overrides the tractor with the hand brakes applied, the strain is absorbed by the yieldable member.

7. In a semi-trailer, the combination of a tractor and trailer provided with swivelling connections, one of said members provided with a pivoted member, the said swivelling connections arranged to permit the trailer to ride forward on the tractor carrying with it said pivoted member, a brake operating pin passing through the swivelling connections and provided with brake connections for applying braking effort to the wheels of the trailer, brake operating connections on the tractor, including a thrust member adapted to be driven in under said pivoted member, and thereby raising the pivoted member to apply the brakes when the thrust member is operated to raise the pivoted member to apply the brakes and when the trailer overrides the tractor.

In testimony whereof I have affixed my signature.

FREDERICK MALCOLM REID.